(12) United States Patent
Huang et al.

(10) Patent No.: US 9,967,985 B2
(45) Date of Patent: May 8, 2018

(54) DISPLAY DEVICE AND ASSEMBLING METHOD THEREOF

(71) Applicant: AU OPTRONICS CORPORATION, Hsin-Chu (TW)

(72) Inventors: Jian-Li Huang, Hsin-Chu (TW); Kuang-Li Huang, Hsin-Chu (TW); Su-Yi Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days. days.

(21) Appl. No.: 15/283,503

(22) Filed: Oct. 3, 2016

(65) Prior Publication Data
US 2017/0105296 A1    Apr. 13, 2017

(30) Foreign Application Priority Data
Oct. 8, 2015    (TW) .............................. 104133243 A (51) Int. Cl.
*H05K 5/02*    (2006.01)
*F16B 5/06*    (2006.01)
(Continued)

(52) U.S. Cl.
CPC .............. *H05K 5/02* (2013.01); *F16B 5/065* (2013.01); *F16B 5/0664* (2013.01);
(Continued)

(58) Field of Classification Search
CPC .................................. H05K 5/02; F16B 21/09
(Continued)

(56) References Cited

U.S. PATENT DOCUMENTS 2,954,196 A * 9/1960 Seager ................. G04B 37/148
248/442
3,271,059 A * 9/1966 Pearson .................... F16B 5/06
24/453
(Continued)

FOREIGN PATENT DOCUMENTS

CN    100424559 C    10/2008
CN    101510026 A    8/2009
(Continued)

OTHER PUBLICATIONS

Office Action dated Jun. 17, 2016 in corresponding patent application in Taiwan.
(Continued)

*Primary Examiner* — Mukund G Patel
(74) *Attorney, Agent, or Firm* — McClure, Qualey & Rodack, LLP (57) ABSTRACT

A display device includes a backplate and a supporting member. The backplate has a positioning hole formed thereon. The positioning hole includes a first area and a second area arranged along a first direction; an average width of the second area in a direction perpendicular to the first direction is smaller than an average width of the first area in the direction perpendicular to the first direction. The supporting member includes a base, a positioning shaft and an engaging protrusion disposed on a bottom face of the base, wherein the positioning shaft includes an axle and a flange portion connected to an end of the axle. The flange portion passes through the first area so that the axle extends into the positioning hole; when the axle moves along the first direction to the second area, the flange portion interferes with a periphery of the second area, the engaging protrusion contacts against an inner wall of the first area to prevent the axle from moving back to the first area.

17 Claims, 13 Drawing Sheets

(51) Int. Cl.
*F16B 21/08* (2006.01)
*G02F 1/1335* (2006.01)

(52) U.S. Cl.
CPC ...... *G02F 1/133608* (2013.01); *F16B 21/086* (2013.01); *G02F 1/133603* (2013.01)

(58) Field of Classification Search
USPC .................................................. 361/807, 804
See application file for complete search history.

(56) References Cited

U.S. PATENT DOCUMENTS

| | | | |
|---|---|---|---|
| 7,070,313 | B2 | 7/2006 | Kim et al. |
| 7,192,149 | B2 * | 3/2007 | Lai .................... G02F 1/133608 362/225 |
| 2002/0039476 | A1 * | 4/2002 | Sauve .................. G02B 6/4478 385/134 |
| 2008/0106905 | A1 | 5/2008 | Zhang et al. |
| 2009/0207335 | A1 | 8/2009 | Lee |

FOREIGN PATENT DOCUMENTS

| | | |
|---|---|---|
| TW | 200612804 | 4/2006 |
| TW | 200821682 | 5/2008 |
| TW | M342515 | 10/2008 |
| TW | M350719 | 2/2009 |

OTHER PUBLICATIONS

Office Action dated Dec. 18, 2017 in corresponding patent application in China.

\* cited by examiner

DISPLAY DEVICE AND ASSEMBLING METHOD THEREOF

BACKGROUND OF THE DISCLOSURE

1. Field of the invention

The present invention generally relates to a display device. Particularly, the present invention relates to a display device having a supporting member.

2. Background

The display device generally includes the backlight module and the display module. The backlight module includes light sources such as Cold Cathode Fluorescent Lamp (CCFL), Hot Cathode Fluorescent Lamp (HCFL), Electrical Luminescence (EL) and Light-Emitted Diode (LED). For the purpose of modulating the emitted light or elevating the quality of light, in addition to the light sources, the backlight module usually further includes an optical adjustment component such as optical film, diffuser film, reflective film and light guide plate. Even though the light sources and the quality of the optical adjustment component is continuously improved, how to select and combine these films is still an issue for achieving a display device with desired display effect.

Figure 1:
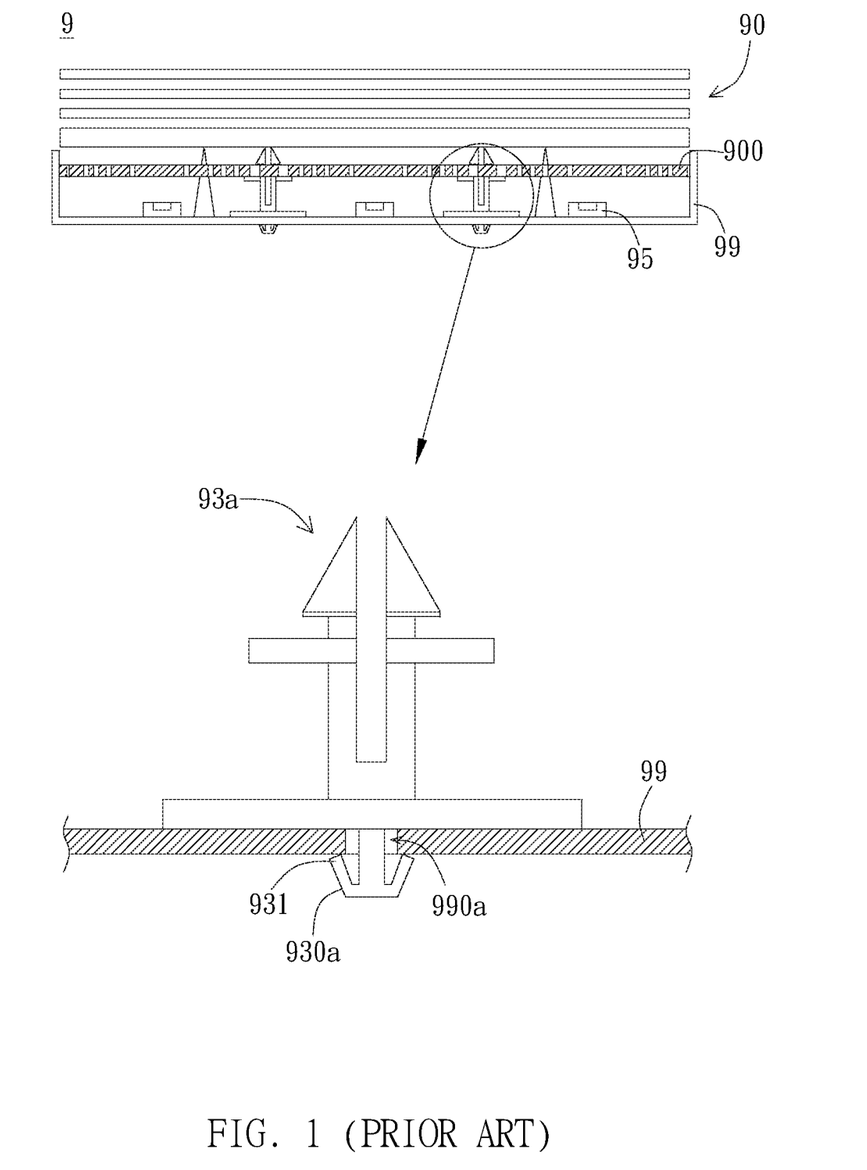
FIG. 1 is a schematic view of the conventional display device and the supporting structure of the optical adjustment sheet.

Take the light source of LED for example. As shown in FIG. 1, LED can work with an optical adjustment component 90 so that the display device has good light expansion and light mixing. Take an optical adjustment sheet 900 for example. The optical adjustment sheet 900 is supported by a supporting structure 93a above the light source 95. The supporting structure 93a can be a plug-unplug type structure with a positioning part 930a. The positioning part 930a has a trim clip fastener 931. The trim clip fastener 931 can be pressed to extend into a positioning hole 990a on a backplate 99 of the backlight module; the trim clip fastener 931 then expands and interferes with the backplate 99. However, it is difficult to confirm from an obverse side whether the trim clip fastener 931 expands and the assembling of the supporting structure 93a to the backplate 99 is completed unless the backplate 99 is turned upside down to confirm. In addition, although the trim clip fastener 931 of the supporting structure 93a ensures the engaging ability of the positioning part 930a, to disassemble the trim clip fastener 931 from the backplate 99 is consequently not easy.

SUMMARY

It is an object of the present invention to provide a display device, wherein a supporting member of the display device provides excellent positioning effect.

It is another object of the present invention to provide an assembling method of a display device, which includes simple steps.

The display device of the present invention includes a backplate and a supporting member. The backplate has a positioning hole, which includes a first area and a second area arranged along a first direction, wherein an average width of the second area in a direction perpendicular to the first direction is smaller than an average width of the first area in the direction perpendicular to the first direction. The supporting member has a base, a positioning shaft and an engaging protrusion, wherein the positioning shaft and the engaging protrusion are disposed on a bottom face of the base; in addition, the positioning shaft includes an axle and a flange portion connected to a distal end of the axle. The flange portion passes through the first area so that the axle extends into the positioning hole, and the axle (which is in the positioning hole) is capable of moving along the first direction to the second area. When the axle moves to the second area, the flange portion interferes with a periphery of the second area, and the engaging protrusion contacts against an inner wall of the first area to prevent the axle from moving back to the first area as well as to prevent the base from rotating with respect to the backplate.

The method of assembling the display device of the present invention includes: (a) passing the flange portion through the first area to make the axle extend into the positioning hole; (b) moving the axle along the first direction to the second area to make a movement of the flange portion be restricted by a periphery of the second area; and (c) when moving the axle, pushing the engaging protrusion into the first area to prevent the axle from moving back to the first area.

DETAILED DESCRIPTION

Figure 2A:
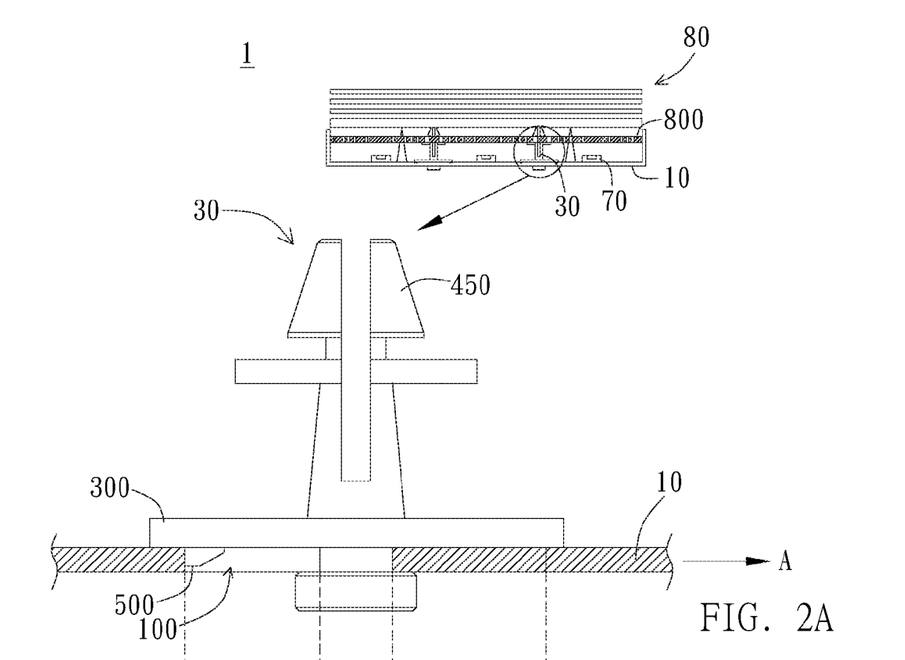
FIG. 2A is a partially enlarged side view of an embodiment of the display module of the present invention.

FIG. 2A shows a side view as well as a partially enlarged view of the display device of the present invention. As the embodiment shown in FIG. 2A, the display device 1 includes a backplate 10 and a supporting member 30. The backplate 10 has a positioning hole 100; the supporting member 30 passes through the positioning hole 100 and is disposed on the backplate 10. The supporting member 30 supports an optical adjusting component 80. In addition, one or more light sources 70 are disposed on the backplate 10 and face an optical adjustment film 800. The backplate 10 preferably serves as a part of the backlight module such as a part of a light case of the backlight module. The optical adjustment component 80 is such as the diffuser sheet, diffuser plate, optical film and optical adjustment film 800. In addition, in some embodiments, the supporting member 30 is also for supporting the light source 70 or other components in the display device 1. In the preferred embodiment of the present invention, the supporting member 30 supports the optical adjustment film 800 at a proper location in the backlight module, wherein the optical adjustment film 800 may be made of light and soft material. Accordingly, the well located optical adjustment film 800 together with the light source 70 accomplishes ideal light expansion and light mixing effect.

Figure 2B:
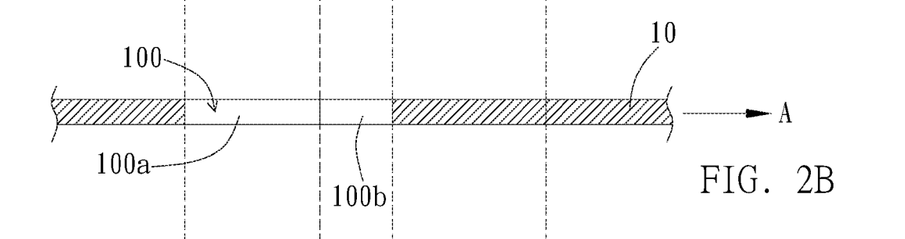
FIG. 2B is a side view of the backplate shown in FIG. 2A.
Figure 2C:
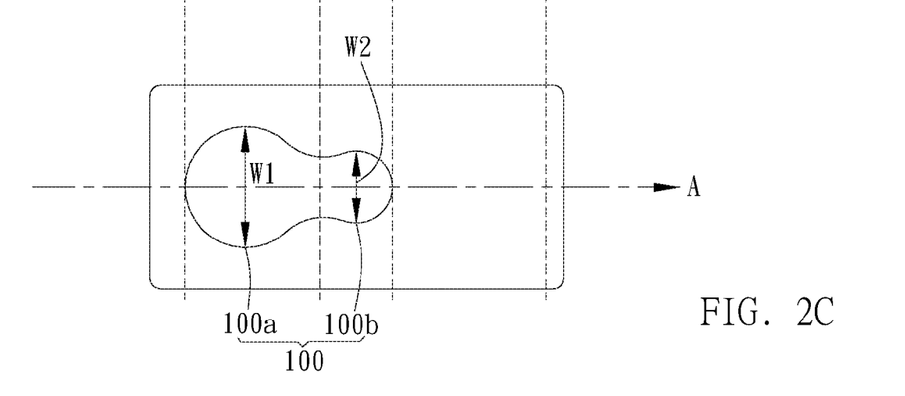
FIG. 2C is a top view of the backplate shown in FIG. 2B.
Figure 3:
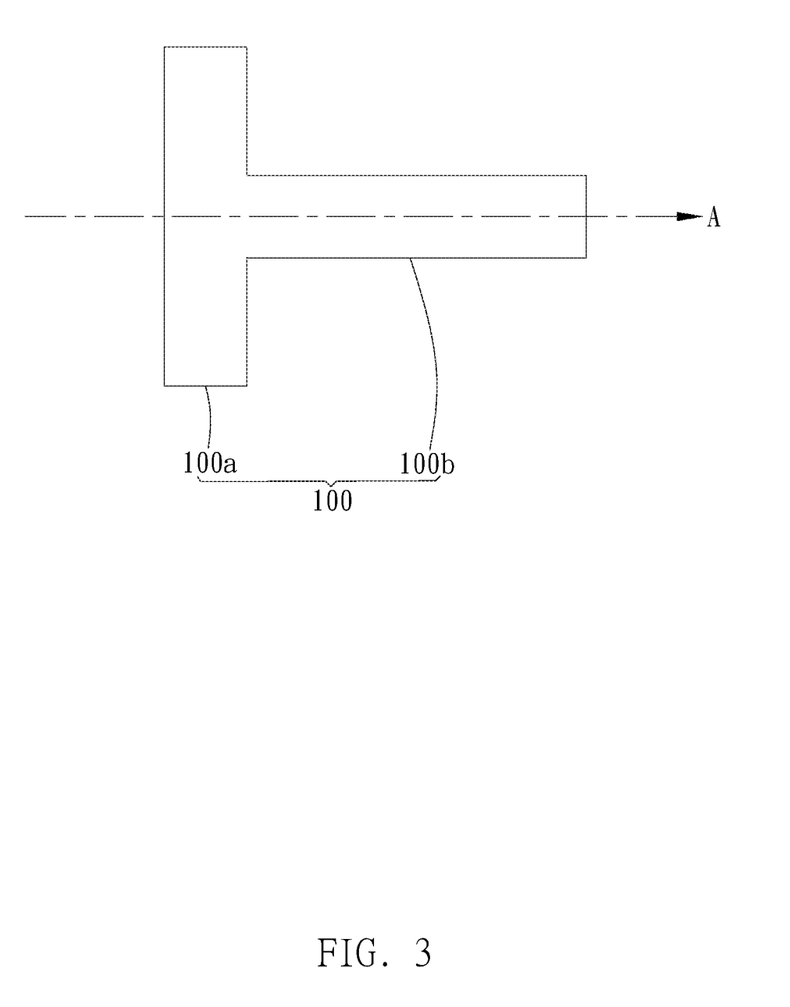
FIG. 3 is a schematic view of another embodiment of the positioning hole of the present invention.

FIG. 2B and FIG. 2C are respectively a side view and a top view (same as bottom view) of the backplate 10 shown in FIG. 2A. As FIGS. 2B-2C show, the positioning hole 100 includes a first area 100a and a second area 100b arranged and distributed along a first direction A. An average width of the first area 100a in the direction perpendicular to the first direction A and an average width of the second area 100b in the direction perpendicular to the first direction A are not equal. For example, the average width W1 of the first area 100a is greater than the average width W2 of the second area 100b. The first area 100a and the second area 100b can be similar in shape but different in size. In other words, the second area 100b can be substantially a proportionally reduced version with respect to the first area 100a. In addition, the average width W2 in the direction perpendicular to the first direction A or an average width of the second area 100b in the direction parallel to the first direction A is smaller than its corresponding average width of the first area 100a in the same direction, but not limited thereto. The first area 100a and the second area 100b of the positioning hole 100 preferably are two connected areas. For example, the first area 100a and the second area 100b are very close to each other and have a transition area located therebetween. The transition area preferably has a width narrower than that of the first area 100a and that of the second area 100b, respectively. In the embodiment shown in FIG. 2C, the first area 100a and the second area 100b substantially have a circular shape. In addition, the two areas are close to each other or connected to each other and constitute a hole having calabash-like shape. In other embodiments, as shown in FIG. 3, the first area 100a and the second area 100b have a rectangular shape, wherein the second area 100b rotates 90 degrees with respect to the first area 100a so that the shorter side of the second area 100b is perpendicular to the first direction A and the longer side is parallel to the first direction A, contrary to the first area 100a.

Figure 4A:
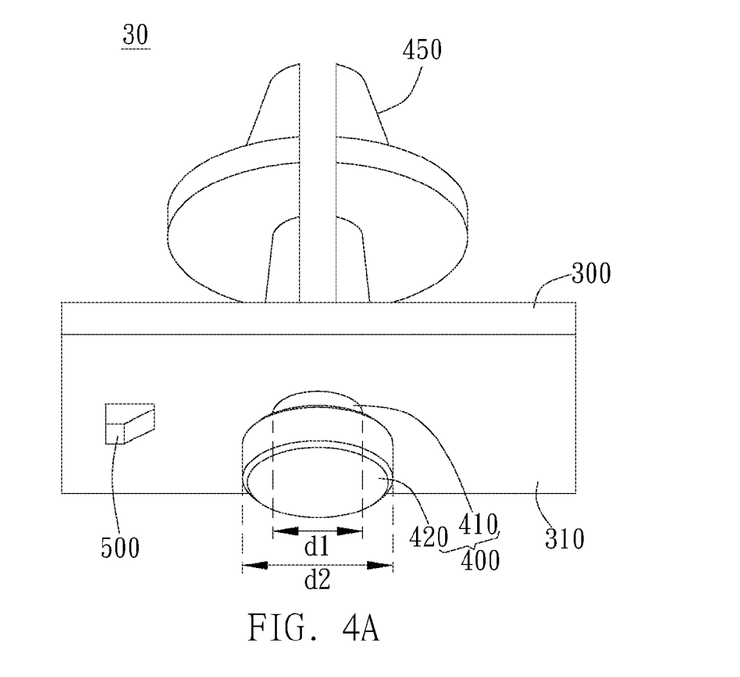
FIG. 4A is a three-dimensional view of the embodiment of the supporting member shown in FIG. 2A.
Figure 4B:
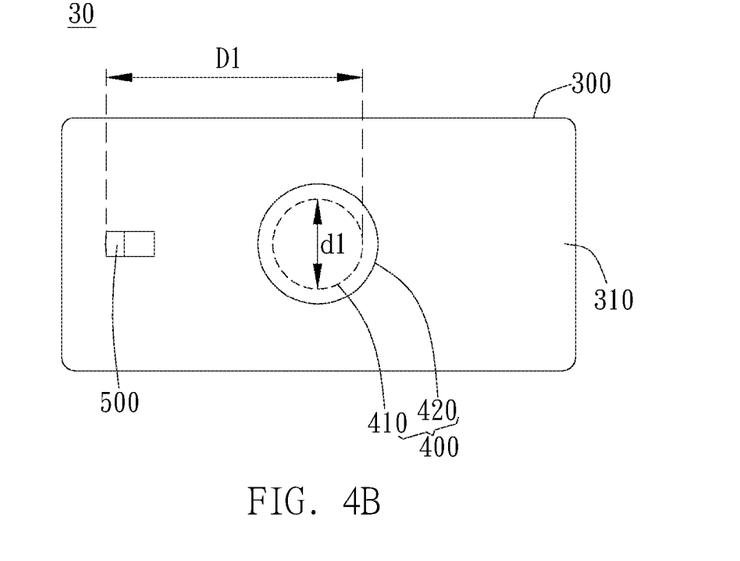
FIG. 4B is a bottom view of the embodiment of the supporting member shown in FIG. 2A.

FIGS. 4A and 4B are a three-dimensional view and a bottom view of the supporting member 30 shown in FIG. 2A, respectively. As shown in FIGS. 4A-4B, the supporting member 30 has a base 300. A positioning shaft 400 is disposed on a bottom face 310 of the base 300 and is able to pass through the positioning hole 100 to let the supporting member 30 be disposed on the backplate 10. The supporting member 30 includes a main body 450 located on a side of the base 300 opposite to the bottom face 310. When the supporting member 30 is disposed on the backplate 10, the base 300 of the supporting member 30 is disposed on the backplate 10 and the main body 450 extends away from the backplate 10 and supports the optical adjustment film 800 with an end away from the backplate 10.

In addition to the positioning shaft 400, an engaging protrusion 500 is further disposed on the bottom face 310. The engaging protrusion 500 can be a protruding bump formed on the bottom face 310 by molding, punching, or a stud additionally attached onto the bottom face 310. The engaging protrusion 500 may have a cylinder, cone, pyramid, frustum, or dot shape. The engaging protrusion 500 is preferably disposed apart from the positioning shaft 400 in a direction. On the other hand, the positioning shaft 400 includes an axle 410 and a flange portion 420, wherein the axle 410 is connected to the bottom face 310, and the flange portion 420 is connected to a distal end of the axle 410 and protrudes in a radial direction of the axle 410. In other words, a measured area of the flange portion 420 is preferably greater than a cross-sectional area of the axle 410. In addition, the flange portion 420 of the positioning shaft 400 passes through the positioning hole 100 in advance, then the axle 410 extends into the positioning hole 100, wherein the measured area of the flange portion 420 preferably is not greater than a measured area of the first area 100a of the positioning hole 100 and not less than a measured area of the second area 100b. Meanwhile, the cross-sectional area of the axle 410 is preferably not greater than the second area 100b.

Figure 5A:
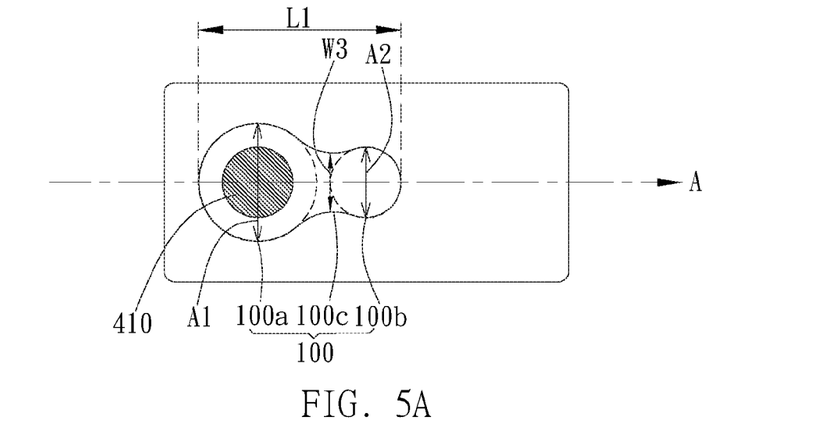
FIGS. 5A-5C are schematic views demonstrating the relative position of the supporting member and the positioning hole.

Take the embodiment shown in FIG. 5A for example, the cross-sectional area of the axle 410 has a circular shape and a diameter d1, the flange portion 420 has a circular shape and a diameter d2; correspondingly, the first area 100a and the second area 100b substantially has circular shapes and diameters A1 and A2, respectively. Therefore, in this embodiment, the diameter d2 is not greater than the diameter A1 but not less than the diameter A2; the diameter d1 is not greater than A2. However, the invention is not limited to the above-mentioned measured-area principle. For example, in other embodiments that the flange portion, the axle, and the areas may not have corresponding shape(s), or in the embodiments as shown in FIG. 3 that shapes thereof are similar (e.g. both the first area 100a and the second area 100b have the rectangular shape) but orientated differently, relations regarding measured area(s) among the flange portion, the axle and the first and second areas may be varied.

Figure 5B:
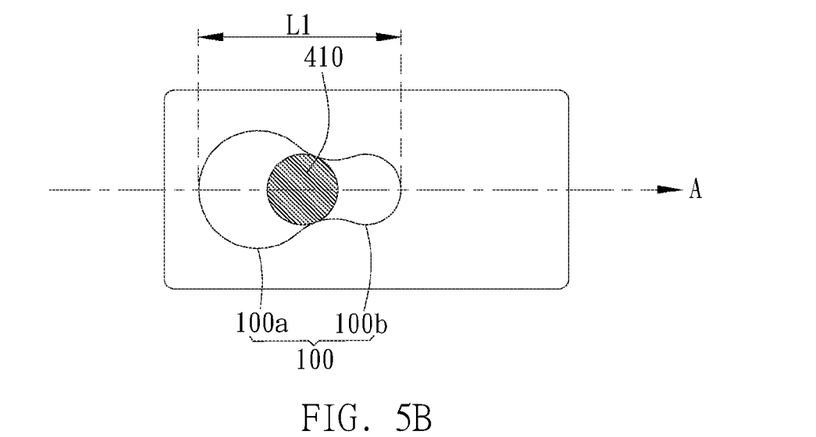
Figure 5C:
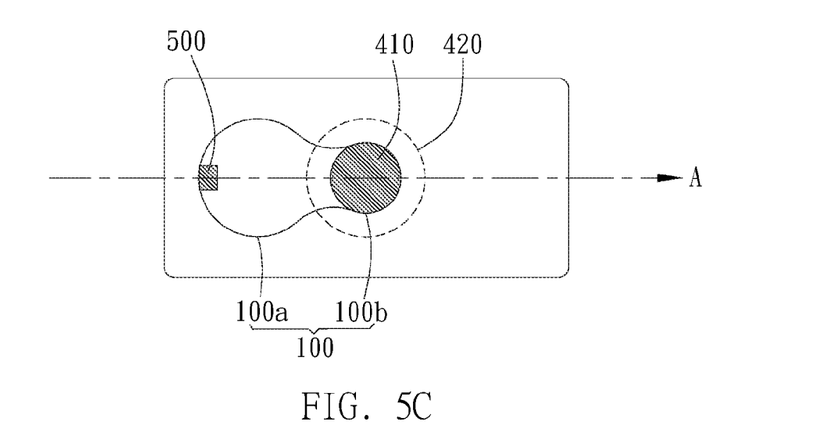

FIGS. 5A-5C demonstrates the supporting member 30 and the positioning hole 100, especially the relative position of the axle 410 and the positioning hole 100. When the axle 410 of the positioning shaft 400 extends into the first area 100a of the positioning hole 100 (FIG. 5A), the axle 410 can move along the first direction A to the second area 100b (FIG. 5B), and the flange portion 420 interferes with a periphery of the second area 100b (FIG. 5C), so that the movement of the flange portion 420 along the axial direction of the axle 410 is restricted. In addition, when the axle 410 of the positioning shaft 400 is located at the first area 100a, the engaging protrusion 500 is located outside the positioning hole 100 and is able to move together with the axle 410 along the first direction A. When the axle 410 moves to the second area 100b, the engaging protrusion 500 moves to the first area 100a and moves specifically to an edge portion of the first area 100a, and the engaging protrusion 500 and the positioning shaft 400 are arranged along the first direction A. In addition, the engaging protrusion 500 moves into the positioning hole 100 and contacts against an inner wall of the first area 100a to prevent the axle 410 from moving back to the first area 100a. Please also refer to FIG. 4B; a length D1 from an end of the engaging protrusion 500 to an end of the axle 410 of the positioning shaft 400 can be substantially equal to a length L1 between two opposite ends of the positioning hole 100 along the direction A.

Figure 6A:
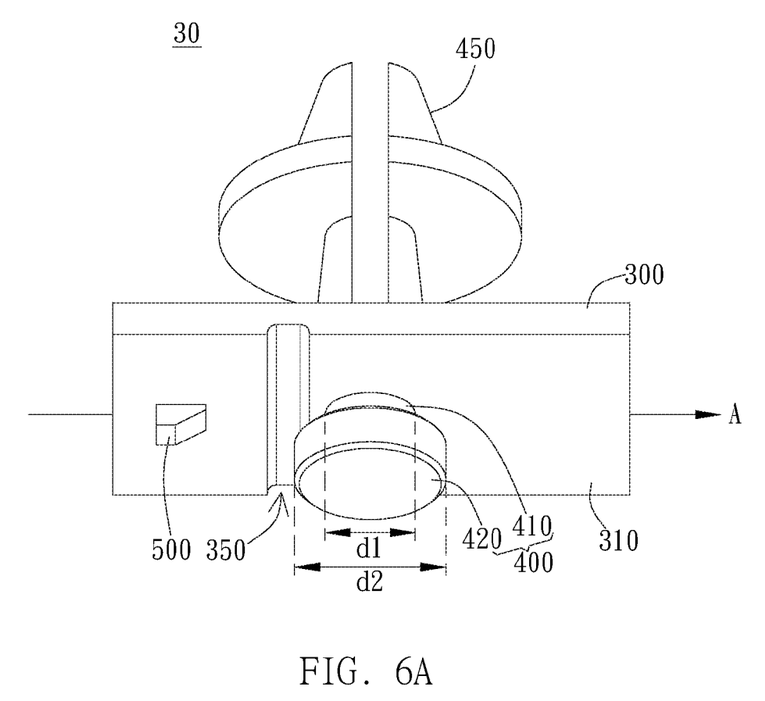
FIGS. 6A-6B are schematic views of another embodiment of the supporting member of the present invention.
Figure 6B:
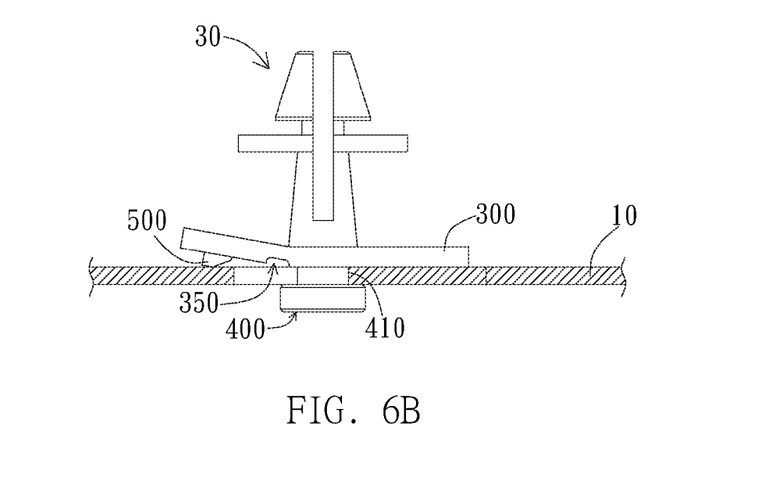

As described above, the engaging protrusion 500 is preferably disposed apart from the positioning shaft 400 in a direction; in addition, a movement of the supporting member 30 with respect to the positioning hole 100 of the backplate 10 is preferably along a predetermined direction. Preferably, when the axle 410 of the positioning shaft 400 is located in the first area 100a, the engaging protrusion 500 is outside the positioning hole 100 and contacts a face of the backplate 10 (e.g. top face); preferably, because of a flexibility of the base 300, the base 300 having the engaging protrusion 500 is capable of bending with respect to the positioning hole 100, which aids an insertion of the positioning shaft 400 into the positioning hole 100. In one embodiment of the present invention, as FIG. 6A-6B show, a weakening trough 350 is further provided on the base 300. The weakening trough 350 is formed on the bottom face 310 and disposed between the positioning shaft 400 and the engaging protrusion 500, wherein the weakening trough 350 extends traverse to the first direction A. The weakening trough 350 elevates the flexibility of the base 300 to enable the portion of the base 300 having the positioning shaft 400 to be adaptively bendable, as shown in FIG. 6B; in other words, an end of the base 300 having the engaging protrusion 500 is also adaptively bendable with respect to the portion of the base 300 having the positioning shaft 400.

In the preferred embodiment of the present invention, please refer to FIGS. 4A-4B and 5A-5C, the flange portion 420 substantially has the circular shape and has the diameter d2, and the axle 410 is substantially a cylinder column. The first area 100a and the second area 100b substantially have the circular shape and have the diameters A1 and A2, respectively, wherein A1>d2>A2>d1. Preferably, the average width W1 of the first area 100a is greater than the diameter d2 of the flange portion 420, and the average width W2 of the second area 100b is smaller than the diameter d2 of the flange portion 420 and greater than the diameter d1 of the axle 410 (W1>d2>W2>d1). In the preferred embodiment of the invention, the transition area is further disposed between the first area 100a and the second area 100b. The transition area is preferably a neck portion 100c which has a width W3 in the direction perpendicular to the first direction A and smaller than a width of the axle 410 in the same direction. In the embodiment of the axle 410 being a cylinder column, the diameter d1 is preferably slightly greater than W3 (i.e. d1>W3). Accordingly, the axle 410 in theory will not pass through the neck portion only when being pushed or squashed so as to pass through the neck portion 110c. That is, the neck portion 100c restricts the axle 410 from freely moving between the first area 100 and the second area 100b.

Figure 7A:
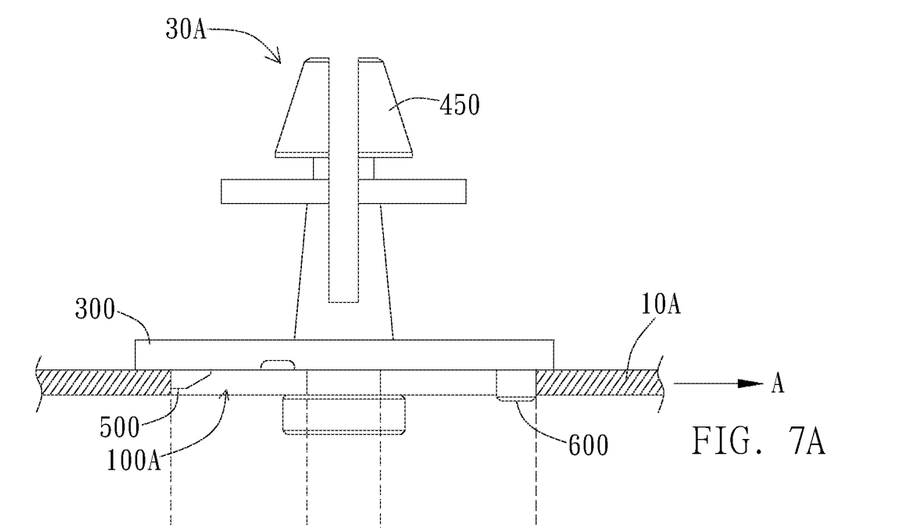
FIG. 7A is a schematic view of another embodiment of the present invention.

FIG. 7A shows another embodiment of the present invention. As the embodiment shown in FIG. 7A, the display device 1 includes a backplate 10A and a supporting member 30A. The backplate 10A has a positioning hole 100A; the supporting member 30A passes through the positioning hole 100A and is disposed on the backplate 10A.

Figure 7B:
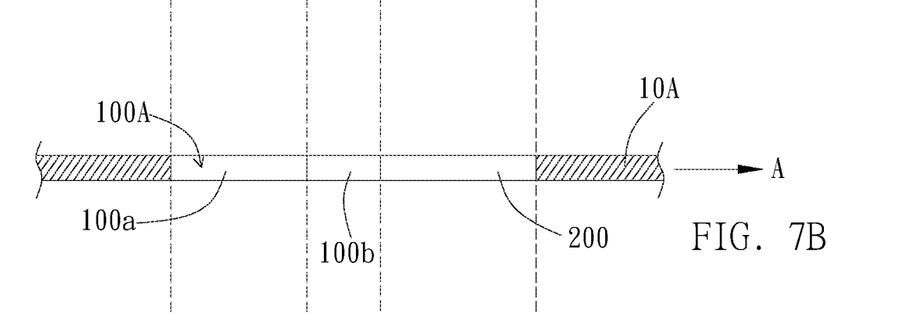
FIG. 7B is a side view of the backplate shown in FIG. 7A.
Figure 7C:
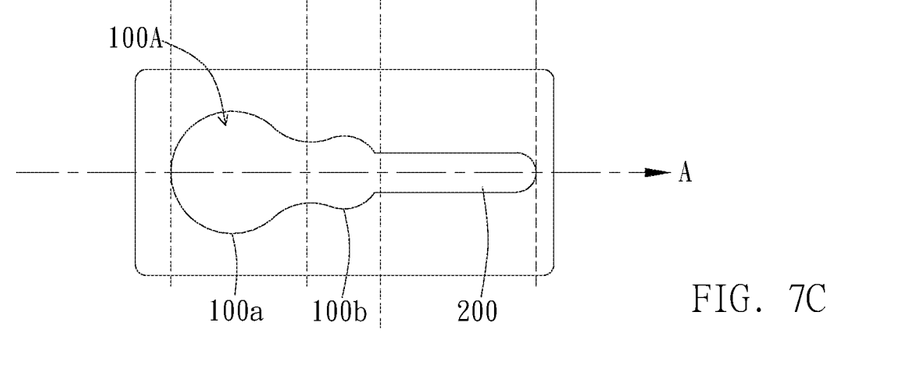
FIG. 7C is a top view of the backplate shown in FIG. 7B.
Figure 8:
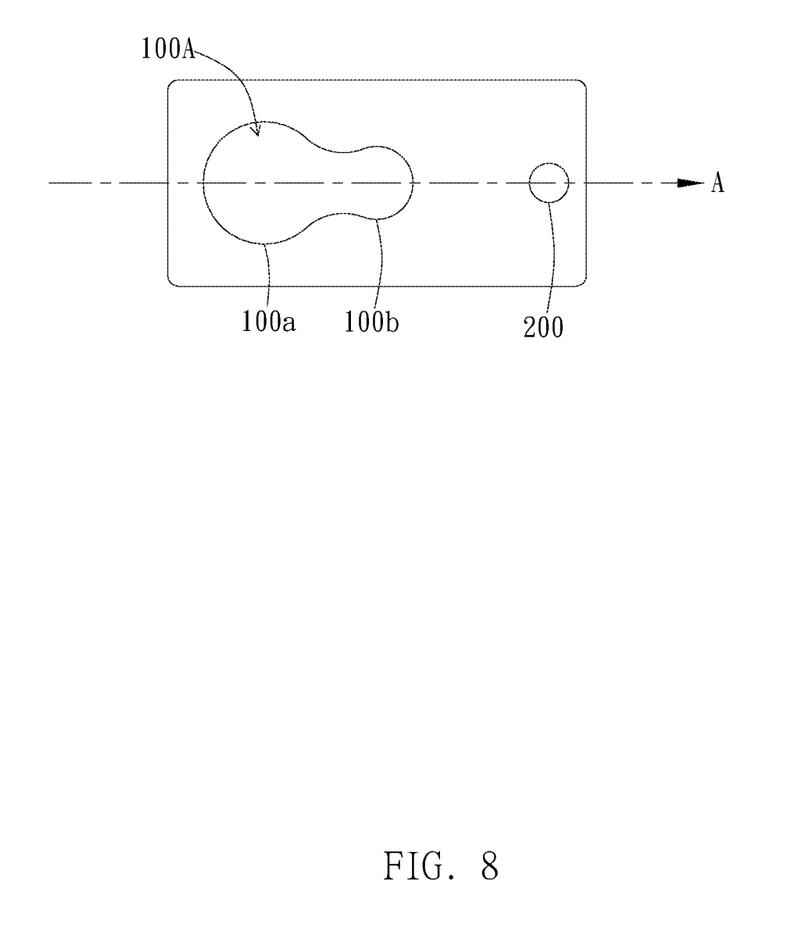
FIG. 8 is a schematic view of another embodiment of the positioning hole of the present invention.

FIGS. 7B and 7C show a side view and a top view (same as bottom view) of the backplate 10A shown in FIG. 7A, respectively. As FIGS. 7B-7C show, the positioning hole 100A includes a first area 100a and a second area 100b arranged and distributed along the first direction A. Features of the first area 100a and the second area 100b are similar to the features of the embodiments shown in FIGS. 2B-2C. In addition, the backplate 10A further has a confining trough 200. As shown in FIG. 8, the confining trough 200 can be disposed apart from the positioning hole 100A. Alternatively, in FIG. 7C, the confining trough 200 is a portion of the positioning hole 100A. In addition, it is preferred that the confining trough 200 extends along the first direction A. In the preferred embodiment of the present invention, the confining trough 200 extends from the second area 100b along the first direction A and away from the first area 100a. In other words, the positioning hole 100A includes the first area 100a, the second area 100b and the confining trough 200, wherein the first area 100a and the confining trough 200 are disposed on two opposite sides of the second area 100b, respectively.

Figure 9A:
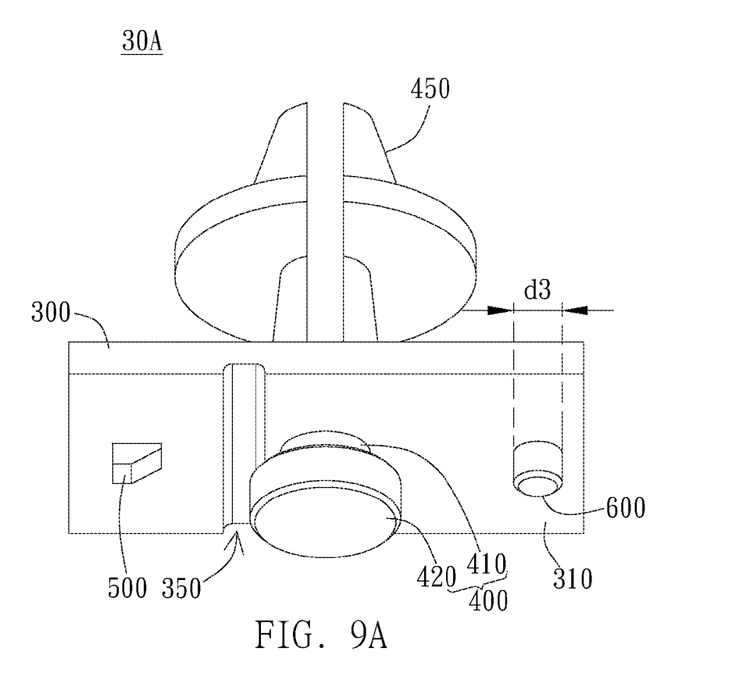
FIG. 9A is another three-dimensional view of the embodiment of the supporting member shown in FIG. 7A.
Figure 9B:
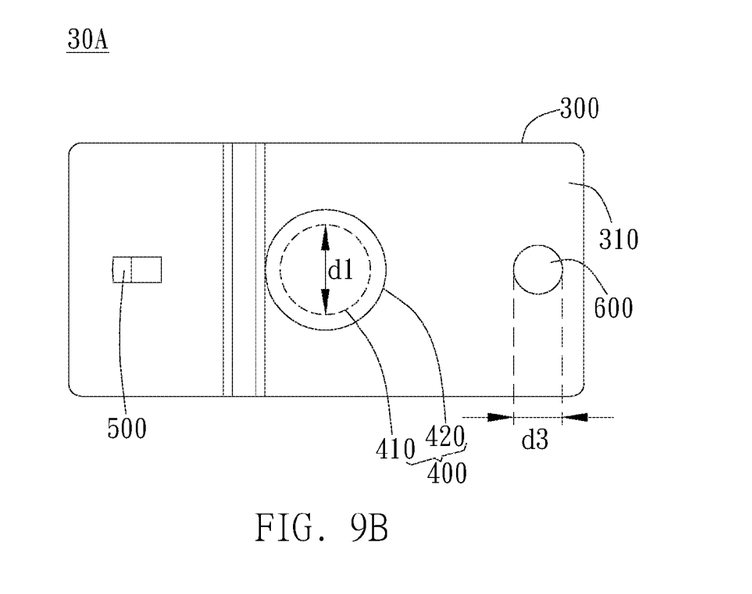
FIG. 9B is a bottom view of the embodiment of the supporting member shown in FIG. 7A.

FIGS. 9A and 9B show a three-dimensional view and a bottom view of the supporting member 30A shown in FIG. 7A. As FIGS. 9A-9B show, the supporting member 30A has a base 300; a positioning shaft 400 is disposed on a bottom face 310 of the base 30 and is able to pass through the positioning hole 100 to let the supporting member 30A be disposed on the backplate 10A. In addition, the supporting member 30A further includes a restriction column 600 disposed on the bottom face 310. The restriction column 600 can be a protruding bump formed on the bottom face 310 by molding, punching, or a stud additionally attached onto the bottom face 310, wherein the shape of the restriction column 600 is not limited to column. Preferably, the restriction column 600 is disposed apart from the positioning shaft 400 in a predetermined direction. The size of the restriction column 600 is designed to allow the restriction column to extend into the positioning hole 100A.

Figure 10A:
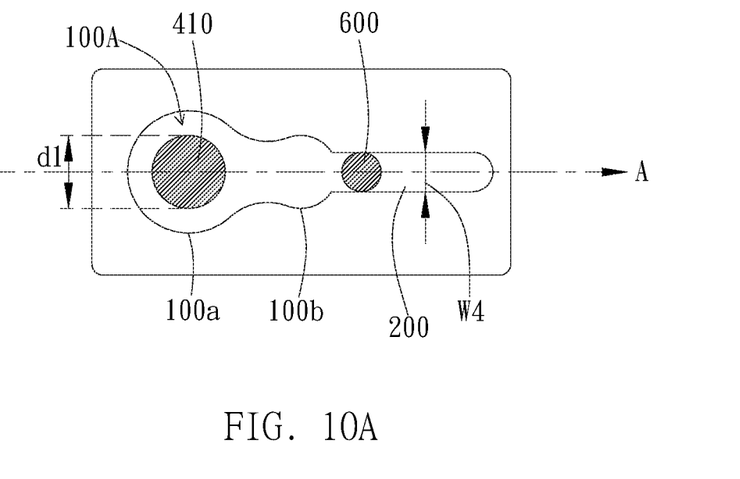
FIGS. 10A-10B are schematic views showing the relative position of the supporting member and the positioning hole.
Figure 10B:
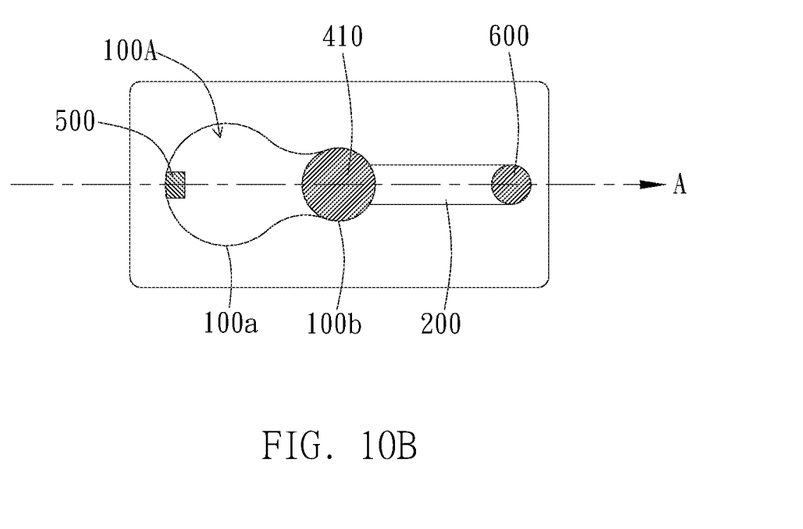

FIGS. 10A-10B demonstrate the relation between the supporting member 30A and the positioning hole 100A, especially the relative position of the axle 410 and the positioning hole 100A. When the axle 410 of the positioning shaft 400 extends into the first area 100a of the positioning hole 100A (FIG. 10A), the axle 410 can move along the first direction A to the second area 100b. When the axle 410 of the positioning shaft 400 is located in the second area 100b, the restriction column 600 is located in the confining trough 200.

Figure 11:
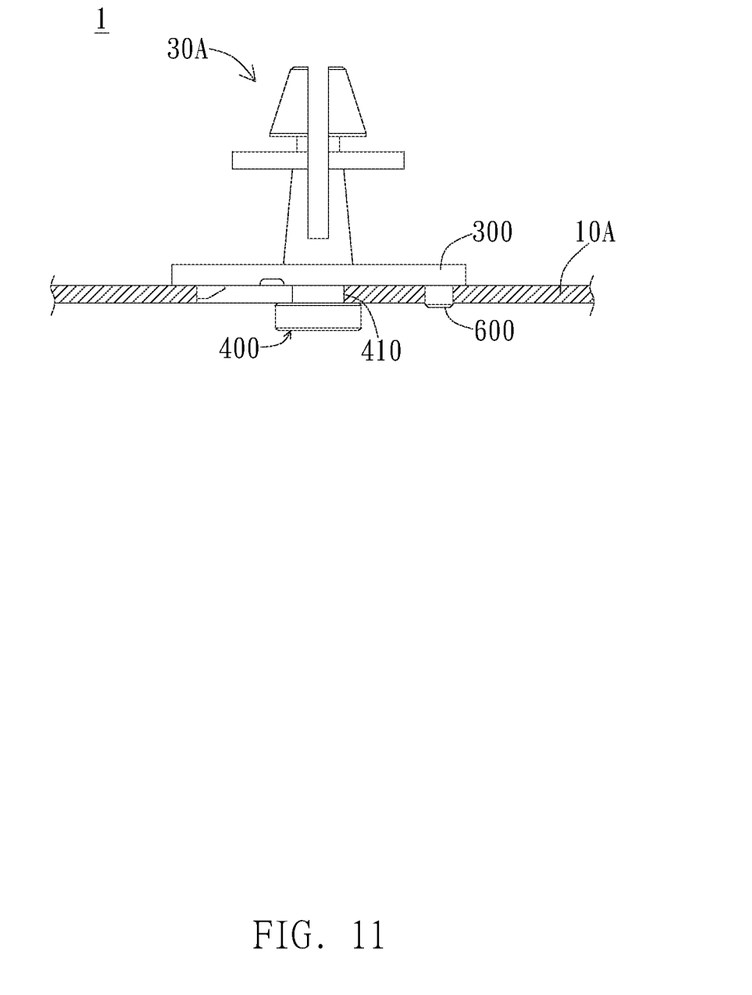
FIG. 11 is a schematic view of another embodiment of the present invention.

In the embodiments, in which the confining trough 200 and the positioning hole 100A are apart from each other, as shown in FIG. 11, when the axle 410 of the positioning shaft 400 is located in the first area 100a, the restriction column 600 can move on the backplate 10 together with the positioning shaft 400. When the axle 410 moves along the first direction A to the second area 100b, it is preferred that the restriction column 600 also arrives the confining trough 200 and is capable of being inserted into the confining trough 200.

In the embodiments where the confining trough 200 communicates with the second area 100b, for example the embodiment that the confining trough 200 extends from the second area 100b along the first direction A and away from the first area 100a (see FIG. 10A), when the axle 410 of the positioning shaft 400 is located in the first area 100a, the restriction column 600 also extends into the positioning hole 100A (e.g. located in the second area 100b) and can move together with the positioning shaft 400 along the first direction A. The average width of the restriction column 600 in the direction perpendicular to the first direction A is smaller than or equal to a width W4 of the confining trough 200. In other words, the confining trough 200 extends along the first direction A and has the width W4 in the direction perpendicular to the first direction A. Please refer to FIGS. 9A-9B, when the restriction column 600 is substantially a cylinder column, a diameter d3 of the restriction column 600 is equal to the width W4. Preferably, the width W4 of the confining trough 200 is smaller than the diameter d1 of the axle 410 of the positioning shaft 400. Accordingly, it is not easy for the axle 410 to further enter the confining trough 200 from the second area 100b.

In one embodiment of the present invention, e.g. the embodiment that the confining trough 200 extending from the second area 100b and away from the first area 100a, when the axle 410 moves in the first direction A to the second area 100b, the restriction column 600 moves along the first direction A to an end of the confining trough 200 opposite to the second area 100b, wherein the supporting member 30A also stops moving as the restriction column 600 contacts against the end of the confining trough 200.

Comparing the combination of the positioning hole and the positioning shaft with the combination of the positioning hole, the positioning shaft, the confining trough and the restriction column, the latter combination provides a linear restriction to eliminate the possibility of rotation that the former combination may occur. Particularly, for the embodiments that the positioning hole has circular shape and the positioning shaft is a cylinder shaft, the linear restriction elevates the stability of the supporting member disposed on the backplate.

As shown in FIGS. 9A-9B, an engaging protrusion 500 is further disposed on the bottom face 310 of the supporting member 30A. Features of the engaging protrusion 500 are similar to the features of the embodiments shown in FIGS. 4A-4B. In addition, in the preferred embodiment of the present invention, the engaging protrusion 500, the positioning shaft 400 and the restriction column 600 are preferably arranged sequentially along an extending direction. Specifically, the engaging protrusion 500, the positioning shaft 400 and the restriction column 600 are arranged in a straight line. As FIGS. 10A-10B show, when the axle 410 of the positioning shaft 400 extends into the positioning hole 100A and moves along the first direction A, it is preferred that the engaging protrusion 500, the positioning shaft 400 and the restriction column 600 are arranged in a straight along the first direction A.

As FIG. 10A shows, when the axle 410 of the positioning shaft 400 extends into the first area 100a of the positioning hole 100, and the restriction column 600 extends into the positioning hole 100A, the engaging protrusion 500 is outside the positioning hole 100. When the axle 410 moves along the first direction A, the engaging protrusion 500 and the restriction column 600 also move along the first direction A. When the axle 410 is located in the second area 100b, the restriction column 600 is located in the confining trough 200 and the engaging protrusion 500 moves to the first area 100a and moves specifically to the edge portion of the first area 100a. Meanwhile, the engaging protrusion 500 may extend into the position hole 100A and contacts against the inner wall of the first area 100a. In addition, the restriction column 600 may contact the end of the confining trough 200 opposite to the second area 100b. Accordingly, not only the engaging protrusion 500 prevents the axle 410 from moving back to the first area 100a, the restriction column 600 and the confining trough 200 also prevent the positioning shaft 410 from rotating. However, in other embodiments, the base 300 may have a hole or recessed portion, and a convex portion or protrusion of the backplate 10A or heat sink extends into the hole or recessed portion to restrict the supporting member 30A from moving and rotating.

The assembling method of the present invention includes assembling the supporting member 30A and the backplate 10. As FIGS. 12 and 13A as well as FIG. 10A show, the assembling method includes step S001: passing the flange portion through the first area to make the axle extend into the positioning hole.

Figure 12:
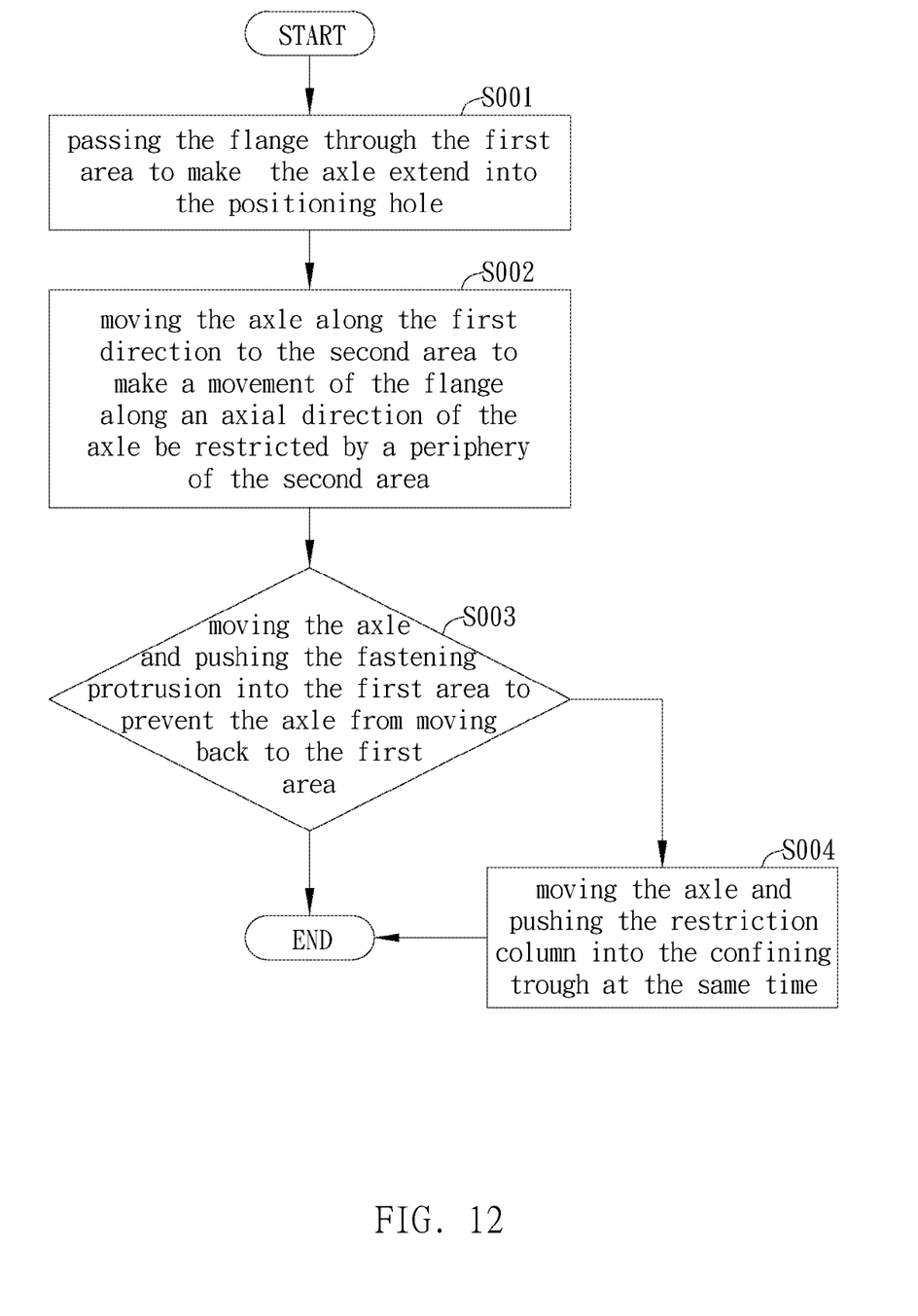
FIG. 12 is a flow chart of the assembling method of the display device of the present invention.
Figure 13A:
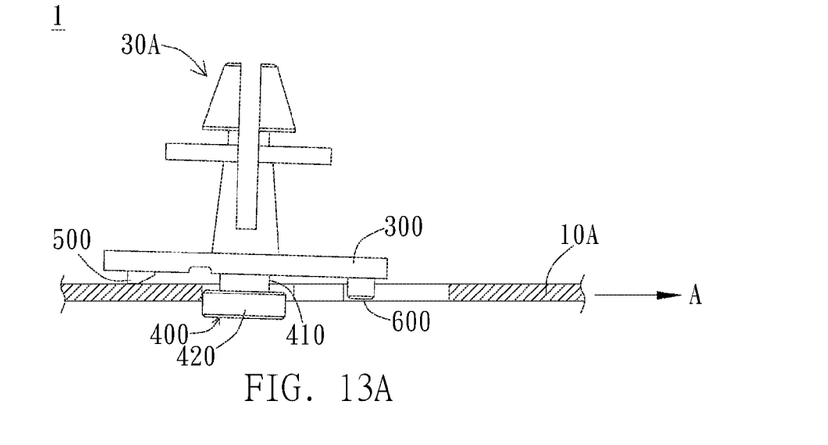
FIG. 13A is a schematic view regarding the step S001 shown in FIG. 12.
Figure 13B:
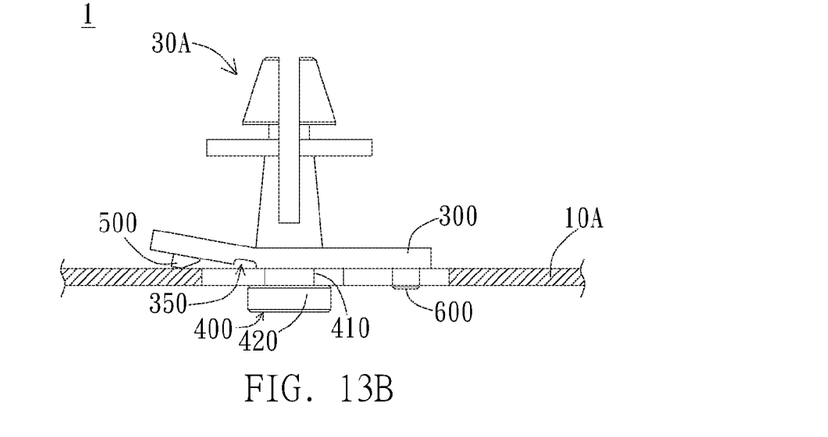
FIG. 13B is a schematic view regarding the step S002 shown in FIG. 12.

As FIGS. 12 and 13B show, the assembling method includes step S002: moving the axle along the first direction to the second area to make a movement of the flange portion be restricted by a periphery of the second area, e.g. the movement along the axial direction of the axle. Please refer to FIG. 5A, in the embodiment that the transition area is formed as a neck portion between the first area 100a and the second area 100b, since the width W3 of the neck portion in the direction perpendicular to the first direction is smaller than the width d1 of the axle in the direction perpendicular to the first direction, the step S002 further includes: pushing or squashing the axle to pass the neck portion into the second area.

Figure 13C:
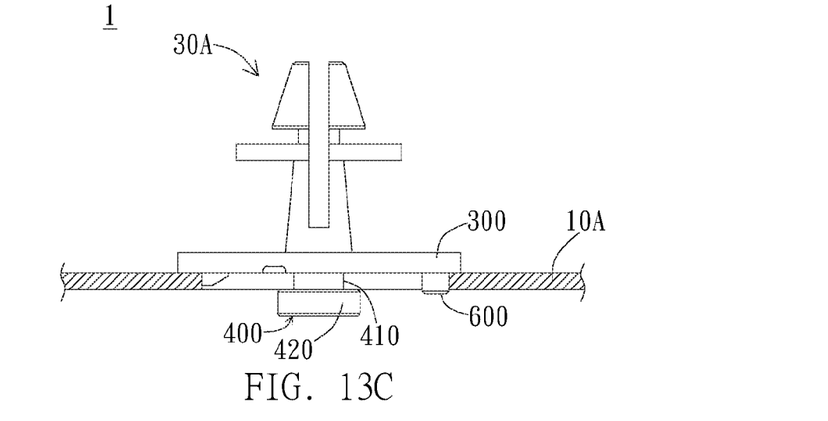
FIG. 13C is a schematic view regarding the step S003 shown in FIG. 12.

As FIGS. 12 and 13C show, the assembling method includes step S003: when moving the axle, pushing the engaging protrusion into the first area to prevent the axle from moving back to the first area. That is, when the axle is moved to the second area, the engaging protrusion moves along with the axle to be positioned into the first area. In the embodiment that the confining trough is formed on the backplate and the supporting member includes the restriction column, the assembling method further includes step S004: moving the axle and pushing the restriction column into the confining trough at the same time. Specifically, the restriction column is inserted into the confining trough. In the embodiment that the backplate has the confining trough extending along the first direction and the supporting member includes the restriction column, the assembling method further includes a step of pushing the restriction column to move in the confining trough. Preferably, the engaging protrusion, the positioning shaft and the restriction column are arranged in a straight line. In the embodiment that the engaging protrusion, the positioning shaft and the restriction column are sequentially arranged along a moving direction, the assembling method further includes: a step of pushing the restriction column, the axle and the engaging protrusion along a same straight line to make the axle move to the second area; on the other hand, the restriction column and the engaging protrusion extend into the confining trough and the first area, which are located at opposite sides of the second area.

As mentioned above, when the axle moves to the second area, the restriction column and the engaging protrusion respectively enter the confining trough and the first area which are located at two opposite sides of the second area, respectively, the engaging protrusion preferably contacts against the inner wall of the first area; meanwhile, the restriction column contacts against the end of the confining trough opposite to the second area.

Although the preferred embodiments of present disclosure have been described herein, the above description is merely illustrative. The preferred embodiments disclosed will not limited the scope of the present disclosure. Further modification of the disclosure herein disclosed will occur to those skilled in the respective arts and all such modifications are deemed to be within the scope of the disclosure as defined by the appended claims.

What is claimed is:
1. A display device, including:
   a backplate having a positioning hole; the positioning hole including a first area and a second area arranged along a first direction, wherein an average width of the second area in a direction perpendicular to the first direction is smaller than an average width of the first area in the direction perpendicular to the first direction; and
a supporting member, comprising:
a base having a bottom face and a weakening trough formed on the bottom face;
a positioning shaft disposed on the bottom face, the positioning shaft comprising an axle and a flange portion connected to a distal end of the axle; and
an engaging protrusion disposed on the bottom face;
wherein the weakening trough disposed between the positioning shaft and the engaging protrusion; the flange portion passes through the first area so that the axle extends into the positioning hole; when the axle moves along the first direction to the second area, the flange portion interferes with a periphery of the second area to restrict a movement of the flange portion, the engaging protrusion contacts against an inner wall of the first area to prevent the axle from moving back to the first area.

2. The display device of claim 1, wherein the backplate has a confining trough extending from the second area along the first direction, the supporting member further comprises a restriction column disposed on the bottom face; when the axle is positioned in the second area, the restriction column is positioned in the confining trough.

3. The display device of claim 1, wherein the backplate has a confining trough formed apart from the positioning hole, the supporting member further comprises a restriction column disposed on the bottom dace; when the axle is positioned in the second area, the restriction column is positioned in the confining trough.

4. The display device of claim 2, wherein the confining trough communicates with the second area; the confining trough and the first area are located at two opposite sides of the second area, respectively.

5. The display device of claim 4, wherein a width of the confining trough in the direction perpendicular to the first direction is smaller than a diameter of the axle.

6. The display device of claim 4, wherein when the engaging protrusion contacts against the inner wall of the first area, the restriction column contacts against an end of the confining trough opposite to the second area.

7. The display device of claim 6, wherein the engaging protrusion, the positioning shaft and the restriction column are arranged in a straight line.

8. The display device of claim 1, wherein the positioning hole further comprises a neck portion located between the first area and the second area, wherein a width of the neck portion in the direction perpendicular to the first direction is smaller than a width of the axle in the direction perpendicular to the first direction.

9. The display device of claim 1, wherein the weakening trough extends traverse to the first direction.

10. The display device of claim 1, wherein when the axle is positioned in the second area, the engaging protrusion and the positioning shaft are arranged along the first direction.

11. The display device of claim 1, wherein the average width of the first area is greater than a diameter of the flange portion; the average width of the second area is smaller than the diameter of the flange portion and greater than a diameter of the axle.

12. A method of assembling a display device, wherein the display device comprises:
a backplate having a positioning hole; the positioning hole including a first area and a second area arranged along a first direction, wherein an average width of the second area in a direction perpendicular to the first direction is smaller than an average width of the first area in the direction perpendicular to the first direction; and
a supporting member, comprising:
a base having a bottom face and a weakening trough formed on the bottom face;
a positioning shaft disposed on the bottom face, the positioning shaft comprising an axle and a flange portion connected to a distal end of the axle; and
an engaging protrusion disposed on the bottom face;
wherein the weakening trough disposed between the positioning shaft and the engaging protrusion;
wherein the method comprises:
(a) passing the flange portion through the first area to make the axle extend into the positioning hole;
(b) moving the axle along the first direction to the second area to make a movement of the flange portion along an axial direction of the axle be restricted by a periphery of the second area; and
(c) when moving the axle, pushing the engaging protrusion into the first area to prevent the axle from moving back to the first area.

13. The method of claim 12, wherein the backplate has a confining trough, the supporting member further comprises a restriction column disposed on the bottom face; the method further comprises: (d) moving the axle and pushing the restriction column into the confining trough at the same time.

14. The method of claim 12, wherein the backplate has a confining trough extending along the first direction, the supporting member comprises a restriction column disposed on the bottom face; the method further comprises: (d) moving the axle and the restriction column moving together in the confining trough.

15. The method of claim 14, wherein the confining trough communicates with the second area, the confining trough and the first area are located at two opposite sides of the second area; the step (d) further comprises: pushing the restriction column, the axle and the engaging protrusion in a same straight line.

16. The method of claim 15, wherein the step (d) further comprises: when the engaging protrusion contacts against an inner wall of the first area, enabling the restriction column to contact against an end of the confining trough opposite to the second area.

17. The method of claim 12, wherein the positioning hole further comprises a neck portion located between the first area and the second area, a width of the neck portion in the direction perpendicular to the first direction is smaller than a width of the axle in the direction perpendicular to the first direction; the step (b) further comprises: pushing the axle to pass the neck portion into the second area.

* * * * *